Patented Feb. 19, 1924.

1,484,190

UNITED STATES PATENT OFFICE.

ARTHUR B. RAY, OF FLUSHING, NEW YORK.

SOLIDIFICATION OF ORGANIC LIQUIDS.

No Drawing. Application filed November 8, 1921. Serial No. 513,835.

*To all whom it may concern:*

Be it known that I, ARTHUR B. RAY, a citizen of the United States, and residing in Flushing, Long Island, New York, have invented certain new and useful Improvements in Solidification of Organic Liquids, of which the following is a specification.

This invention relates to the solidification or oils and other liquids.

An object of this invention is to provide an economical commercial process whereby liquids can be transformed into solidified products which are satisfactorily rigid and permanent under conditions of storage and transportation.

A more specific object of this invention is to treat ordinary flammable liquids, for example, the hydrocarbon fuel oils such as gas oil, distillate fuel oil, kerosene, gasoline, benzene, toluene, etc., and other hydrocarbon liquids such as turpentine, etc., or mixtures of such liquids in such a manner as to cause them to become solidified and to possess properties and characteristics which make them suitable for uses for which they can not be satisfactorily employed while in the liquid state.

A still further object of this invention is to treat certain liquids to convert them into solidified products whereby, because of their composition and physical state, they will possess unique and very desirable properties, making them specially suitable for special uses such as incendiaries, fuels, etc.

In prior attempts to solidify organic liquids, stearic or other suitable fatty acid has been added to the liquid to be solidified and then treated with an alcoholate dissolved in the alcohol from which it is derived whereby a more or less solid mass is produced. Since an alcoholate can not exist in appreciable amounts in alcohol which is not relatively free from water, such a process necessitates the use of a very high grade and expensive alcohol. This fact limits the use of such a process, and on account of the high cost, in many instances precludes its use.

I have found that if the reaction between a suitable alkali and a suitable fatty acid is brought about in the organic liquid so as to cause the soap formed to be evenly distributed throughout the liquid there will be formed upon cooling a gel or solidified product having a rigid cellular structure. The rigidity and permanence of the gel are dependent upon the amount and proper distribution of the rigid structural material. Sodium stearate is a satisfactory structural material but the desired cellular structure will not be produced by simply introducing it into the liquid. It is necessary that the stearate be formed in the liquid and under certain definite conditions if a satisfactory product is to be obtained.

I have found that a more or less satisfactory structure can be obtained by causing ammonium stearate, for instance, to be formed in the liquid by introducing ammonia gas into the liquid which contains stearic acid. Similarly, a more or less satisfactory structure can be obtained by introducing with agitation an aqueous solution of sodium hydroxide into the liquid containing stearic acid. If the conditions are such as to cause the soap formed to be evenly distributed throughout the liquid and to possess the desired structural characteristics, the product will be solidified. One means of obtaining this even distribution and desired structural characteristics of the soap is to have present also a liquid in which both stearic acid and sodium hydroxide are soluble.

A very satisfactory liquid, especially from a commercial standpoint, to act as the common solvent is a mixture of water and alcohol which can carry in solution a relatively large amount of the desired alkali such as sodium hydroxide. The alkali is dissolved in water and this aqueous solution is diluted with alcohol so as to give a fairly concentrated solution of the hydroxide in the alcohol-water mixture. Since this mixture carries a relatively large amount of alkali only a small amount need be used to saponify the fatty acid previously introduced into the liquid to be solidified. The process is therefore made commercially practicable and possesses a very marked advantage over the old process because the use of a large quantity of high grade alcohol is avoided.

The liquids which may be solidified by my improved process comprise practically all non-acidic, non-saponifiable organic liquids but more especialy the petroleum liquids, such as fuel oils, kerosene, gasoline, naphtha, butane, etc.; liquids resulting from the distillation of coal, such as gas oil, gas tar, benzol, toluol, etc.; turpentine, alcohols, carbon tetrachloride, ethers, etc. It is possible also to solidify very volatile liquids and liquids in which gaseous substances are dissolved by heating under pressure. Kerosene in which butane has been dissolved gives a very satisfactory solidified product for fuel purposes. This process is therefore applicable to the solidification of a great variety of both flammable and non-flammable liquids of varying degrees of volatility.

The fatty acid which I employ is preferably stearic acid. The stearic acid may contain impurities up to 20%, provided oleic acid is not in excess of 5%. The presence of palmitic acid up to 20% is not harmful. Although a fair product may be prepared by the use of palmitic acid, I prefer stearic acid because the soap resulting therefrom is harder and the cellular structure formed more rigid.

The saponifying alkali may be any of the ordinary alkalis used for this purpose but I prefer sodium hydroxide because of its cheapness. A commercial grade of this material may be used provided it does not contain much carbonate.

The alkali is dissolved in a small amount of water and this concentrated solution is mixed with a non-aqueous liquid such as an alcohol. The mixture should contain not more than 15% by volume of water because alcohol containing more than this quantity of water does not act, satisfactorily, as a solvent for stearic acid and the reaction product is not uniformly distributed. The solution of alcohol and water should preferably not contain much more than 10% by weight of NaOH. More concentrated solutions give products which are solidified unevenly; also, great trouble is experienced with frothing when highly concentrated solutions are employed.

A specific example of my process is as follows: A fuel oil distillate is heated in a steam jacketed kettle to 80–100° C., and 1.5–2.5% pulverized stearic acid added. The mixture is then stirred by a mechanical stirrer until the stearic acid is dissolved or evenly distributed through the oil and the theoretical amount of sodium hydroxide, dissolved in a water-alcohol mixture, is added slowly with slight stirring. If the oil is too hot or the stirring too vigorous, frothing occurs and the resulting product is not hard.

The liquid, after the addition of the sodium hydroxide, is then run into containers and allowed to cool. This results in a firm and permanent product.

If kerosene or gasoline is to be solidified, the mixture of these with the stearic acid is heated to 70–80° C. About 3% of the stearic acid may be employed with enough sodium hydroxide added to completely neutralize the stearic acid. Volatile liquids or liquids in which highly volatile substances are dissolved are of course heated under pressure.

The quality of product resulting from my process is governed more by the physical structure than by specific chemical properties and it is therefore important to carry out the steps of the process so that uniform distribution of the material constituting the supporting frame-work is obtained.

When organic liquids other than alcohol are to be solidified, it is not essential that any of the alcohol from the solution of the alkali remain in the final product, although some alcohol usually does remain. Alcohol itself, when solidified by dissolving therein stearic acid and then adding NaOH, forms a very hard cake and its presence in the solid has a beneficial effect, but it can be driven off and still leave a satisfactory product. The product formed by carrying out the process as described is not water-free because water is introduced and formed by the reaction of the alkali and fatty acid and is not entirely eliminated by the heat applied. The amount of water present, however, is small and does not noticeably or injuriously affect the quality of the material.

These solidified organic liquids have a great many uses, some of which will be here set forth.

The solidified petroleum distillates, for instance, when placed in suitable military devices and ignited in the proper manner, have an excellent incendiary action. Such a material has a very high heat of combustion and the large hot flame resulting from the ignition of a large exposed mass of the material is very efficacious. The incendiary action is further enhanced by the fact that the liquid oil, which results from the melting of the exposed mass of solid oil, spreads the conflagration over a considerable area and actually renders the target more inflammable.

When it is desired to use the solidified flammable products as a fuel they are placed in suitable containers and their complete combustion controlled by suitable means. The solidified light petroleum products are especially valuable as a convenient fuel for use on a large scale for preparing meals and for heating under a variety of conditions. These products have the advantages over solidified alcohol because they are much cheaper, have higher heats of combustion, and as a rule burn for a longer time. Solidified kerosene, for instance, furnishes heat at approximately one sixth of the cost of furnishing it by solidified alcohol.

In the following claims the expression "water-alcohol mixture" is used to define a mixture wherein the water is present in sufficient quantity to dissolve all of the alkali, independent of the alcohol present therein.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of solidifying organic liquids, adding to a heated, non-acidic, non-saponifiable, organic liquid a small amount of heavy fatty acid whose alkali soap is substantially solid at ordinary temperatures, saponifying said acid by adding a solution of an alkali in a water-alcohol mixture and cooling the resulting mixture.

2. In a process of solidifying organic liquids, adding to a heated, non-acidic, non-saponifiable, organic liquid a small amount of heavy fatty acid whose alkali soap is substantially solid at ordinary temperatures, saponifying said acid by adding an equivalent amount of a solution of an alkali in a water-alcohol mixture while agitating, and cooling the resulting mixture.

3. In a process of solidifying organic liquids, adding to a heated, non-acidic, non-saponifiable, organic liquid a small amount of stearic acid, saponifying the stearic acid by adding a solution of an alkali in a water-alcohol mixture and cooling the resulting mixture.

4. In a process of solidifying organic liquids, adding to a heated, non-acidic, non-saponifiable, organic liquid a small amount of stearic acid, saponifying the stearic acid by adding an equivalent amount of a solution of an alkali in a water-alcohol mixture while agitating, and cooling the resulting mixture.

5. In a process of solidifying hydrocarbon liquids, adding to said liquid a small amount of heavy fatty acid whose alkali soap is substantially solid at ordinary temperatures, saponifying said acid by adding a solution of an alkali in a water-alcohol mixture and cooling the resulting mixture.

6. In a process of solidifying hydrocarbon liquids, adding to said liquid a small amount of stearic acid, saponifying the stearic acid by adding a solution of an alkali in a water-alcohol mixture and cooling the resulting mixture.

7. In a process of solidifying organic liquids, adding to a heated, non-acidic, non-saponifiable, organic liquid small amounts of stearic and palmitic acids, saponifying said acids by means of a solution of an alkali in a water-alcohol mixture and cooling the resulting mixture.

8. In a process of solidifying organic liquids, adding to a heated, non-acidic, non-saponifiable, organic liquid small amounts of stearic, palmitic and oleic acids, saponifying said acids by means of a solution of an alkali in a water-alcohol mixture and cooling the resulting mixture.

9. In a process of solidifying hydrocarbon liquids, adding to said liquids a small amount of stearic and palmitic acids, saponifying said acids by adding a solution of an alkali in a water-alcohol mixture and cooling the resulting mixture.

10. In a process of solidifying hydrocarbon liquids, adding to said liquids a small amount of stearic, palmitic and oleic acids, saponifying said acids by adding a solution of an alkali in a water-alcohol mixture and cooling the resulting mixture.

11. In a process of solidifying kerosene, adding to the kerosene a small amount of heavy fatty acid whose alkali soap is substantially solid at ordinary temperatures, saponifying said acid by adding a solution of an alkali in a water-alcohol mixture and cooling the resulting mixture.

12. In a process of solidifying kerosene, adding to the kerosene a small amount of stearic acid, saponifying the stearic acid by adding a solution of an alkali in a water-alcohol mixture and cooling the resulting mixture.

13. In a process of solidifying kerosene, adding to the kerosene a small amount of stearic and palmitic acids, saponifying said acids by adding a solution of an alkali in a water-alcohol mixture and cooling the resulting mixture.

14. In a process of solidifying kerosene, adding to the kerosene a small amount of stearic, palmitic and oleic acids, saponifying said acids by adding a solution of an alkali in a water-alcohol mixture and cooling the resulting mixture.

15. In a process of solidifying organic liquids, heating under pressure a non-acidic, non-saponifiable, organic liquid carrying a gaseous substance, adding a small amount of heavy fatty acid whose alkali soap is substantially solid at ordinary temperatures, saponifying said acid by adding a solution of an alkali in a water-alcohol mixture and cooling the resulting mixture.

16. In a process of solidifying hydrocarbon liquids carrying gaseous substances, heating same under pressure, adding thereto a small amount of heavy fatty acid whose alkali soap is substantially solid at ordinary temperatures, saponifying the fatty acid by adding a solution of an alkali in a water-alcohol mixture and cooling the resulting mixture.

17. In a process of solidifying hydrocarbon liquids carrying gaseous substances, heating same under pressure, adding thereto a small amount of stearic acid, saponifying the stearic acid by adding a solution of an alkali in a water-alcohol mixture and cooling the resulting mixture.

ARTHUR B. RAY.